United States Patent
Ueda et al.

(10) Patent No.: US 7,952,245 B2
(45) Date of Patent: May 31, 2011

(54) POWER DISTRIBUTION UNIT FOR ROTARY ELECTRIC MACHINE WITH LINEAR CONDUCTOR CONNECTING RING HAVING TERMINAL SECTION WITH AXIALLY EXTENDING HOLE FOR CONNECTING STATOR COIL, AND METHOD FOR ASSEMBLING ROTARY ELECTRIC MACHINE

(75) Inventors: Toshiaki Ueda, Naka (JP); Katsuhiro Hoshino, Hitachinaka (JP); Shin Onose, Naka (JP); Akira Toba, Naka (JP); Koji Obata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 244 days.

(21) Appl. No.: 12/108,821

(22) Filed: Apr. 24, 2008

(65) Prior Publication Data

US 2008/0265701 A1 Oct. 30, 2008

(30) Foreign Application Priority Data

Apr. 25, 2007 (JP) ................................. 2007-115643

(51) Int. Cl.
*H02K 3/18* (2006.01)
*H02K 11/04* (2006.01)
*H02K 3/28* (2006.01)
*H02K 3/34* (2006.01)
*H02K 11/00* (2006.01)

(52) U.S. Cl. .......................... 310/71; 310/66; 310/68 R

(58) Field of Classification Search .................... 310/71, 310/66, 68 R; *H02K 3/18, 3/28, 3/34, 11/00, H02K 11/04*
See application file for complete search history.

(56) References Cited

U.S. PATENT DOCUMENTS

| 6,737,773 | B2 * | 5/2004 | Hayashi et al. .................. 310/71 |
| 7,034,419 | B2 | 4/2006 | Kabasawa et al. |
| 7,164,217 | B2 | 1/2007 | Kabasawa et al. |
| 7,498,702 | B2 * | 3/2009 | Migita et al. ..................... 310/71 |
| 2006/0068617 | A1 * | 3/2006 | Migita et al. ................. 439/76.2 |
| 2007/0076354 | A1 * | 4/2007 | Kato et al. ..................... 361/637 |
| 2009/0039720 | A1 * | 2/2009 | Tsukashima et al. ........... 310/71 |

FOREIGN PATENT DOCUMENTS

| EP | 1 638 188 A1 | 3/2006 |
| JP | 59-47954 A | 3/1984 |
| JP | 2004-96841 A | 3/2004 |
| JP | 2005-86985 A | 3/2005 |
| JP | 2005086985 A * | 3/2005 |
| JP | 2006-268567 A | 10/2006 |
| WO | WO 2006/050765 A1 | 5/2006 |

OTHER PUBLICATIONS

"JP2005-086985translation.pdf" Machine translation of Toyama et al. (JP2005-086985).*
European Search Report dated Sep. 26, 2008 (Four (4) pages).

* cited by examiner

*Primary Examiner* — Quyen Leung
*Assistant Examiner* — Michael Andrews
(74) *Attorney, Agent, or Firm* — Crowell & Moring LLP

(57) ABSTRACT

The power distribution unit for a rotary electric machine includes a connecting ring unit that connects stator coils of the same phase. The connecting ring unit includes at least one linear conductor integrally formed in a ring-like shape, and the connecting ring unit includes a terminal section integrally formed in the linear conductor. The terminal section is constituted by a hole through which a wiring end of the stator coil is inserted and a protrusion formed in a direction of the hole to which the wiring end of the stator coil is connected. Also disclosed are a rotary electric machine includes the power distribution unit and a method for assembling a rotary electric machine.

6 Claims, 6 Drawing Sheets

POWER DISTRIBUTION UNIT FOR ROTARY ELECTRIC MACHINE WITH LINEAR CONDUCTOR CONNECTING RING HAVING TERMINAL SECTION WITH AXIALLY EXTENDING HOLE FOR CONNECTING STATOR COIL, AND METHOD FOR ASSEMBLING ROTARY ELECTRIC MACHINE

INCORPORATION BY REFERENCE

The disclosure of the following priority application is herein incorporated by reference:

Japanese Patent Application No. 2007-115643 (filed Apr. 25, 2007)

Also, the disclosures of the following references are herein incorporated by reference:

U.S. Patent Application Publication No. US 2003/0173842 A1 published Sep. 18, 2003

U.S. Pat. No. 6,034,460.

BACKGROUND OF THE INVENTION

1. Field of the Invention

The present invention relates to a rotary electric machine, a power distribution unit therefor, and a method for assembling rotary electric machine. More particularly, the present invention relates to a power distribution unit for a rotary electric machine with a connection ring, utilized for the connection of a stator coil of the rotary electric machine.

2. Description of Related Art

A rotating electric machine is disclosed in U.S. Pat. No. 6,034,460, which includes a stator having stator salient poles, three-phases windings wound around the stator salient poles, a rotor rotatably held inside the stator, and permanent magnets inserted into the rotor and positioned opposite to the stator salient poles. The three-phase windings are concentratively wound around each of the stator salient poles, the windings of each phase are wound around at more than one stator salient pole, and the windings of each phase have a phase difference of voltage between at least one of the windings and the other. A centralized power distribution machine, for example, a three-phase thin DC brushless motor to be used in a hybrid automobile is disclosed in U.S. Patent Application Publication No. US 2003/0173842A1. As shown in FIG. 1 of this publication, the motor 11 is disposed between an engine 12 and a transmission 13. The thin DC brushless motor 11 includes a rotor 14 connected, e.g., directly connected, to a crankshaft of the engine 12, and a ring-like stator 15 enclosing the rotor 14. The stator 15 includes a plurality of magnetic poles that have windings 16 on cores, a stator holder 18 that contains the magnetic poles, and an annular centralized distribution unit 17 that concentratedly distributes currents to the windings 16.

In a conventional power distribution unit for a rotary electric machine, a terminal of a stator coil is inserted into a through hole formed in a connecting ring and fixed thereto (for example, Japanese Laid-Open Patent Application No. 2005-86985).

Also, a conventional power distribution unit for a rotary electric machine includes ring-like lead frames for U, V, and W phases. In each of the lead frames, a connecting terminal section to be connected with a coil is formed by bending work so as to protrude inwards in the radial direction of the rotary electric machine. The lead frames for U-, V-, and W-phases overlap as seen in the direction of center axis and integrally fixed with a partial fixing unit (see, for example, Japanese Patent No. 3701639 corresponding to Japanese Laid-Open Patent Application No. 2004-96841).

However, with the construction of the power distribution unit disclosed in Japanese Laid-Open Patent Application No. 2005-86985, the part where the through hole is to be provided is pressed to form a planar part before the through hole can be fabricated. This causes the connecting part to extend in a transverse direction, i.e., in a direction of radius of the stator. As a result, it is difficult to secure a distance necessary for achieving sufficient insulation from adjacent connecting rings of other phases.

Since the surface of the connecting ring around the through hole is planar, it is somewhat difficult to insert a coil terminal into the through hole. Also, when welding of the coil terminal to the connecting ring is attempted, it is difficult to achieve an acceptable heat balance between the coil terminal to be welded and the connection ring since the volume of the molten part around the through hole is much larger than the volume of the coil terminal. This makes it difficult to perform welding.

In the construction of the power distribution unit disclosed in Japanese Laid-Open Patent Application No. 2004-96841, the lead frames for the U-, V-, and W-phases overlap as seen in the axial direction, that is, three or more connecting rings overlap as seen in the axial direction. This inevitably results in broadening of a space on an edge of the stator in the axial direction to increase the size of the rotary electric machine in the axial direction. In addition, to establish connection with a stator coil terminal, connecting parts 13 and 113 are required. Accordingly, many parts are necessary, which leads to an increase in the cost of parts and hence production cost.

SUMMARY OF THE INVENTION

An object of the present invention is to provide a power distribution unit that allows insulation distances between adjacent connecting rings of different phases to be secured, that is easy to be welded, and that can be reduced in size in the axial direction, at a low cost with productivity without increasing the number of parts.

(1) In order to achieve the above-mentioned object, the present invention according to a first aspect provides a power distribution unit for a rotary electric machine, including: at least one connecting ring that connects stator coils of the same phase. The at least one connecting ring includes at least one linear conductor integrally formed in a ring-like shape, and the at least one connecting ring includes each a terminal section integrally formed in the linear conductor, the terminal section being constituted by a hole through which a wiring end of one of the stator coils is inserted and a protrusion formed in a direction of the hole to which the wiring end of one of the stator coils is connected.

(2) In (1) above, it is preferred that the power distribution unit further includes an insulating member of a torus shape, and that the at least one connecting ring includes connecting rings for U-, V-, and W-phases, respectively, and a connecting ring for neutral points, arranged on the insulating member substantially in the same plane and concentrically, with each connected with the wiring ends of the stator coils corresponding thereto.

(3) In (2) above, it is preferred that the connecting rings include each a coated linear conductor with a coating of an insulation material, the terminal section of each coated linear conductor, which is provided with the hole through which the wiring end is to be inserted and the protrusion in the direction of the hole, is free of the coating of the insulation material, and the terminal sections of the linear conductors for U, V, and W phases and the linear conductor for the neutral points are arranged at mutually different positions in the circumferential direction such that the terminal sections are not adjacent to each other.

(4) The present invention provides a rotary electric machine including a power distribution unit described in (1) above. The power distribution unit is arranged on an end face of a wiring section of the stator coil in a direction of an axis of a stator.

(5) The present invention provides a rotary electric machine including a power distribution unit described in (1) above. The wiring end of the stator coil is inserted in the hole, caulked for fixation by the protrusion formed in the terminal section, and connected to the protrusion of the terminal section by soldering, welding or brazing.

(6) The present invention also provides a method for assembling a rotary electric machine comprising a power distribution unit according to the construction explained above and stator coils. The method comprises of inserting the wiring end of the stator coil into the hole, caulking the wiring end of the stator coil for fixation by the protrusion formed in the terminal section, and connecting the wiring end of the stator coil to the protrusion of the terminal section by soldering, welding or brazing.

DETAILED DESCRIPTION OF THE INVENTION

Hereinafter, the construction of the power distribution unit for a rotary electric machine according to one embodiment of the present invention will be described with reference to FIGS. 1 to 6.

Figure 1:
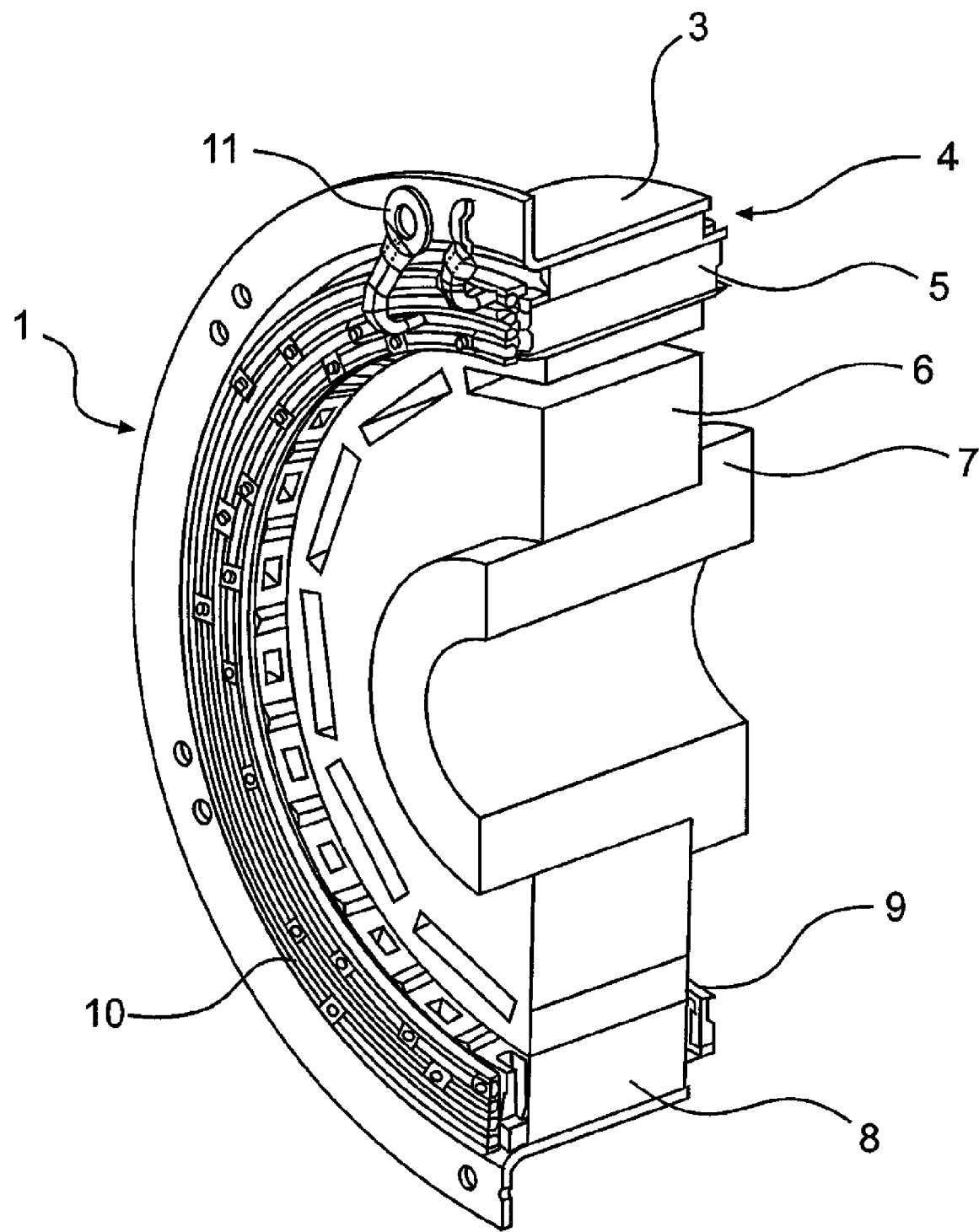
FIG. 1 is a cross-sectional perspective view of an essential part of a rotary electric machine in which a power distribution unit according to one embodiment of the present invention is used.

First, referring to FIG. 1, explanation is made on the construction of the rotary electric machine in which the power distribution unit according to one embodiment of the present invention is used.

FIG. 1 is a cross-sectional perspective view of an essential part of a rotary electric machine in which a power distribution unit according to one embodiment of the present invention is used.

A rotary electric machine 1 is of a type used for a hybrid car. The rotary electric machine 1 as shown is of a thin type and is arranged between an engine (not shown) and a transmission (not shown). The rotary electric machine 1 includes a rotor 6, which is fitted in a shaft 7 and is coupled with a crankshaft (not shown) of the engine and the transmission through a switching device such as a clutch (not shown). A stator 4 is fixed to a housing 3. The housing 3 is fixed to a casing (not shown) of the engine or the transmission. The rotor 6 is rotatable relative to the stator 4.

The rotary electric machine 1 is supplied with electric power to supplementarily assist the engine. Alternatively, the rotary electric machine 1 alone drives a vehicle (not shown) through the transmission. Moreover, the rotary electric machine 1 can convert a portion of the vehicle's kinetic energy to electric power when the vehicle slows down.

In this embodiment, the rotary electric machine 1 is of a three-phase alternating current (AC) type. A plurality of stator coils 5 are provided in the stator 4 and are star-connected with a power distribution unit 10 such that they correspond to a U-phase, a V-phase, a W-phase, and neutral points, respectively. The power distribution unit 10 is provided with a power supply terminal set 11, which includes electric power supply terminals 11U, 11V, and 11W corresponding to the U-, V-, and W-phases, respectively. In the power supply terminal set 11, electric powers of U-, V-, and W-phases are supplied to the electric power supply terminals 11U, 11V, and 11W, respectively.

Figure 2:
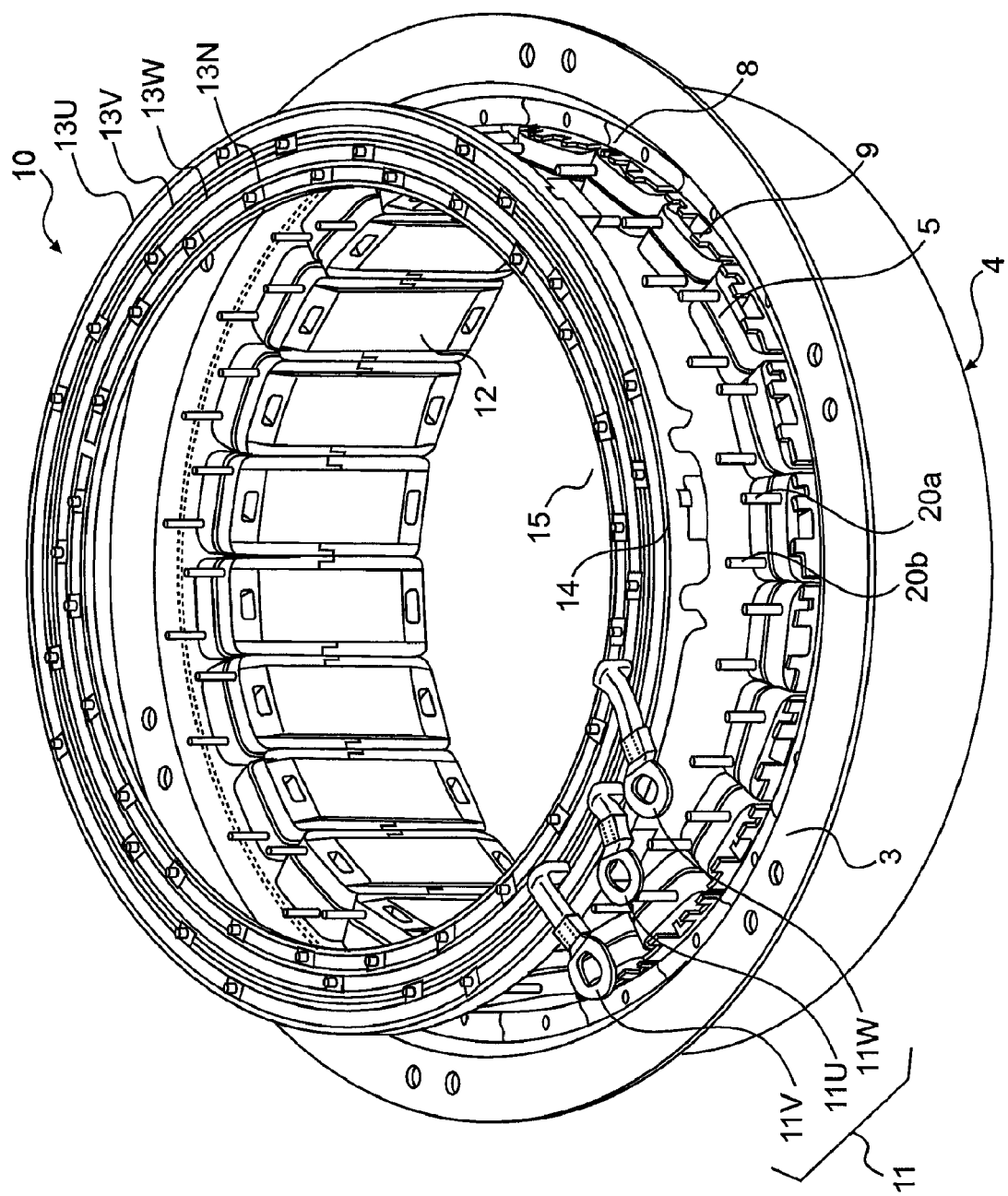
FIG. 2 is an exploded perspective view showing a construction of a connection unit where a connecting ring and a stator coil connect with each other, the connection unit being a power distribution unit of a rotary electric machine according to one embodiment of the present invention.

Referring to FIG. 2, explanation is made on the construction of a connecting unit in which the connection rings and the stators are connected with each other, i.e., the power distribution unit according to this embodiment.

FIG. 2 is an exploded perspective view showing the construction of a connecting unit in which the connection rings and the stators are connected with each other, i.e., the power distribution unit according to this embodiment.

The stator 4 includes a plurality of stator cores 8 arranged in the circumferential direction. The stator core 8 is provided with a tooth section 12 that protrudes inward in a radial direction. A conductor with an insulation coating (enameled wire) is wound around the tooth section 12 via a bobbin 9 made of an insulation material to form a single stator coil 5. A plurality of such stator coils 5 is circumferentially arranged. The stator cores 8 arranged in the circumferential direction are pressed or shrunk fit into the housing 3 to form the stator core 4, which is circular.

Terminals of the stator coil 5 are arranged such that after the enameled wire is twisted around a collar section of the bobbin 9, the terminals of the enameled wire are raised up in an axial direction of the rotary electric machine 1 and set in array. The insulation coating of the coil terminal section is peeled off both at a starting position where the winding starts and at an ending position where the winding is ended. Moreover, the power distribution unit 10 is provided above an upper surface of the stator coil winding section positioned on an end face of the stator in its axial direction, so that the stator coil winding section is covered with the power distribution unit 10. The connecting rings 13U, 13V, and 13W provided in the power distribution unit 10 are connected with coil ends 20a of the stator coils for the U-, V-, and W-phases, respectively, to allow excitation currents of U-, V-, and W-phases to be supplied to the stator coils 5 from the power supply terminals 11U, 11V, and 11W, respectively. On the other hand, the other coil ends 20b of the stator coils 5 are connected to a connecting ring 13N for neutral points over the whole circumference to constitute neutral points of the star-connection. The power distribution unit 10 includes an insulating member 15 provided with a protrusion for fixation 14, and the power distribution unit 10 is fixed to the stator 4 by fitting the protrusion for fixation 14 with the bobbin 9.

Figure 3:
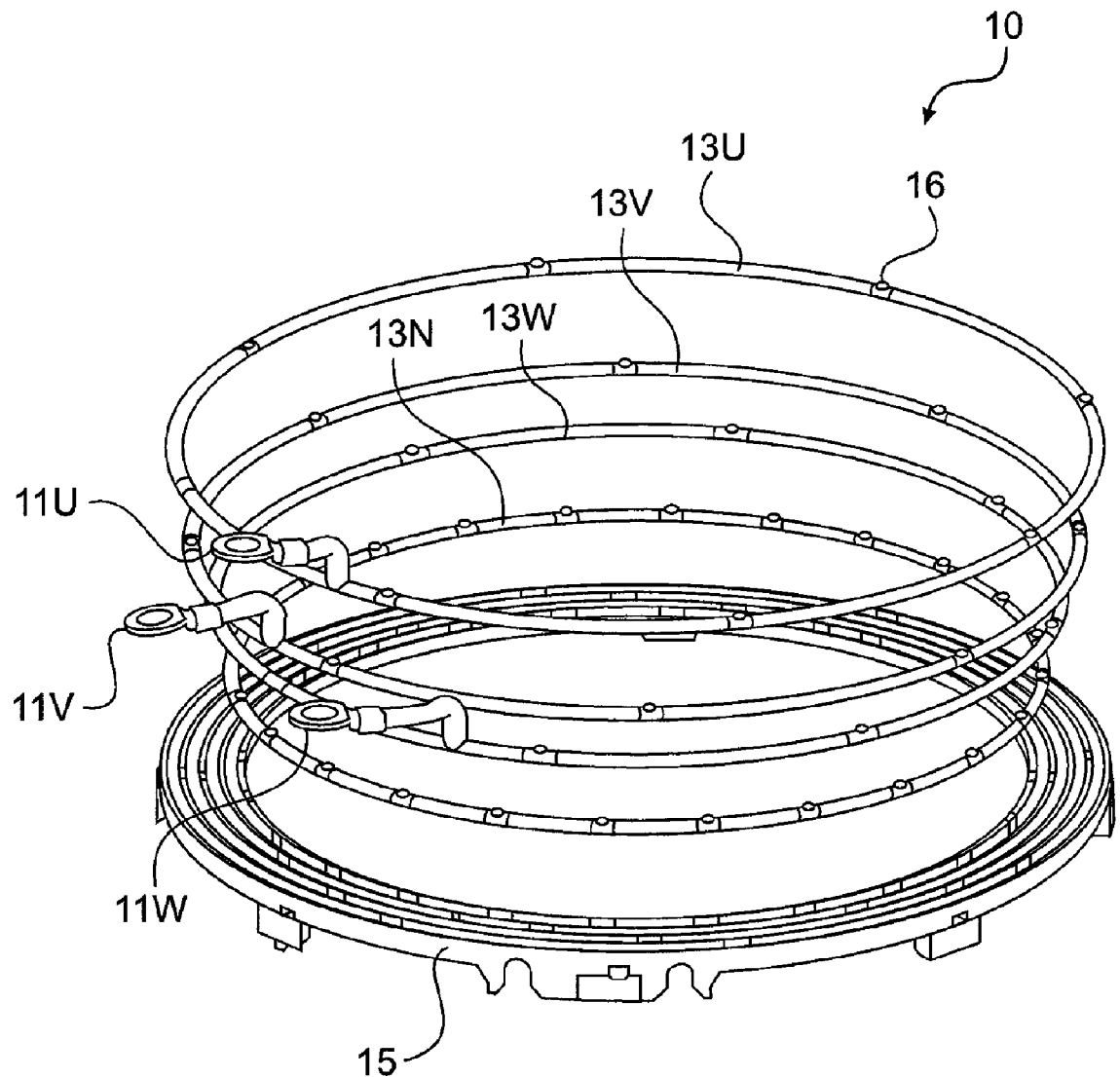
FIG. 3 is an exploded perspective view showing a construction of a connecting ring, which is a power distribution unit of a rotary machine according to one embodiment of the present invention.

Referring to FIG. 3, the construction of the connecting ring according to this embodiment is described.

FIG. 3 is an exploded perspective view showing the construction of the connecting ring according to one embodiment of the present invention.

The power distribution unit 10 includes the connecting rings 13U, 13V, and 13W corresponding to U-, V-, and W-phases, respectively, and the connecting ring 13N that constitutes a neutral point of star connection, and the insulating member 15 that houses the connecting rings 13U, 13V, 13W, and 13N. The connecting rings 13U, 13V, and 13W are each in the form of an annular ring and include each a plurality of terminals 16 (eight (8) terminals for each connecting ring in this embodiment) protruding in the direction of axis of the rotary electric machine 1. Also, the connecting rings 13U, 13V, and 13W include three-phase power supply terminals 11U, 11V, and 11W, respectively, provided outward in the radial direction.

Figure 6:
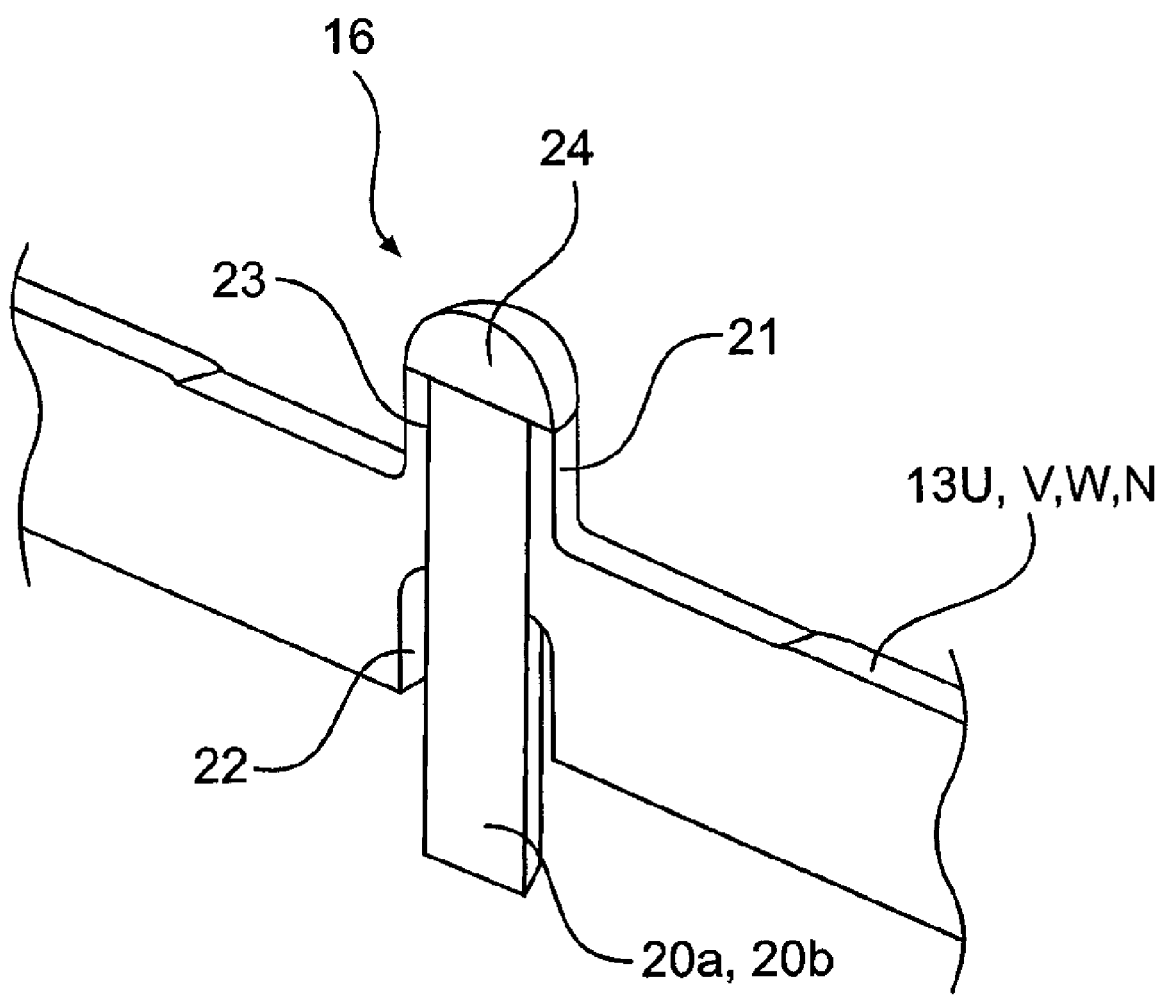
FIG. 6 is a cross-sectional perspective view showing a construction of a terminal section of the connecting ring in a power distribution unit of a rotary electric machine according to one embodiment of the present invention.

The connecting rings 13U, 13V, and 13W include each a wire of a single conductor (linear conductor) coated with an insulation material. After the insulation coating of each of the insulated wires is removed at positions where the terminals 16 and the power supply terminals 11U, 11V, and 11W are to be connected, the wires are each rounded into an annular ring. Then, both ends of the obtained annular rings are bent outward in the radial direction, and the power supply terminals 11U, 11V, and 11W are caulked and fixed to the respective bent ends of the annular rings and connected by soldering, brazing, or TIG welding. Then, the terminals 16 are each formed with holes 22 and 23 through which the coil ends 20a and 20b of the stator coil are to be inserted (FIG. 6) and a protrusion 21 extending in a penetrating direction of the holes 22 and 23 for joining and connecting with the coil ends 20a and 20b (FIG. 6). Note that the constructions of the holes 22 and 23 (FIG. 6) and the protrusion 21 (FIG. 6) will be described later on with reference to FIG. 6.

On the other hand, the connecting ring 13N is in the form of an annular ring and includes a plurality of terminals 16 (twenty four (24) terminals on a connecting ring for neutral points in this embodiment) that protrude in the direction of axis of the rotary electric machine 1. The connecting ring 13N is formed into an annular ring by removing the insulation coating at the connecting section of a conductor and rounding it in the same manner as in the case of the connecting rings 13U, 13V, and 13W. The neutral points, at which one of the terminals of each stator coil is connected in common, are left as they are, i.e., in the form of an annular ring as formed. Then, the connecting rings 13U, 13V, 13W, and 13N are arranged on the insulating member 15, which is of a torus shape, in a concentric fashion. In this embodiment, the insulating member 15 is formed with grooves that correspond to the connecting rings. The connecting rings 13N, 13W, 13U, and 13V are arranged in order in the grooves from inside toward outside in the radial direction and integrated to constitute the power distribution unit 10. The terminals 16 of the connecting rings are arranged staggered in a circumferential direction so that they are not adjacent to each other. For example, the terminals of the connecting rings are arranged such that they do not substantially align in a radial direction. That is, the terminals are arranged in a fashion such that assuming an imaginary line in the radial direction passes through any one terminal of one phase, another terminal of different phase is offset from the imaginary line in the circumferential direction to achieve a predetermined insulation distance between the two terminals of the connecting rings for different phases.

Figure 4:
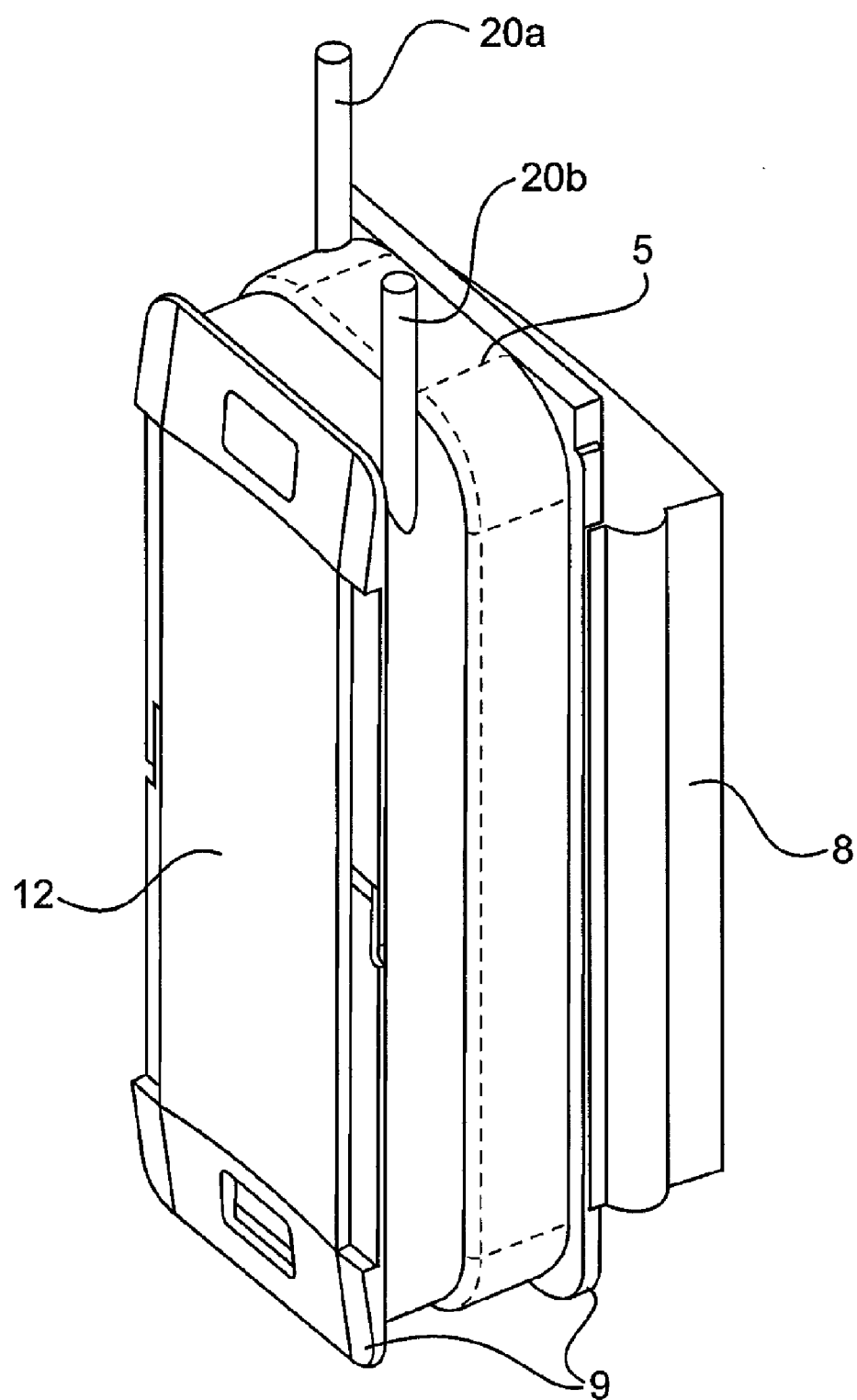
FIG. 4 is a perspective view showing the shape of a stator coil after winding for use in a rotary electric machine according to one embodiment of the present invention, the stator coil being presented alone or before assembling.

Referring to FIG. 4, explanation is made on the shape of an individual stator coil after winding for use in a rotary electric machine according to one embodiment of the present invention.

FIG. 4 is a perspective view showing the shape of an individual stator coil according to one embodiment of the present invention.

FIG. 4 shows an appearance of the individual stator coil 5 after winding. The coil ends 20a and 20b at the start and the end of the winding are each in a state in which the insulation coating at the tip thereof is peeled off. The coil ends 20a and 20b are twisted around the collar of the bobbin 9 and then bent and raised upward in the axial direction of the stator 4.

Each of the coil ends 20b at the start side is raised upward just below each of the terminals 16 of the connecting ring 13N (FIG. 3) as a neutral point, and each of the other coil ends 20a is raised up just below each of the terminals 16 of the connecting rings 13U, 13V, and 13W, which serve as wire connections for U-, V-, and W-phases, respectively (FIG. 3).

Figure 5:
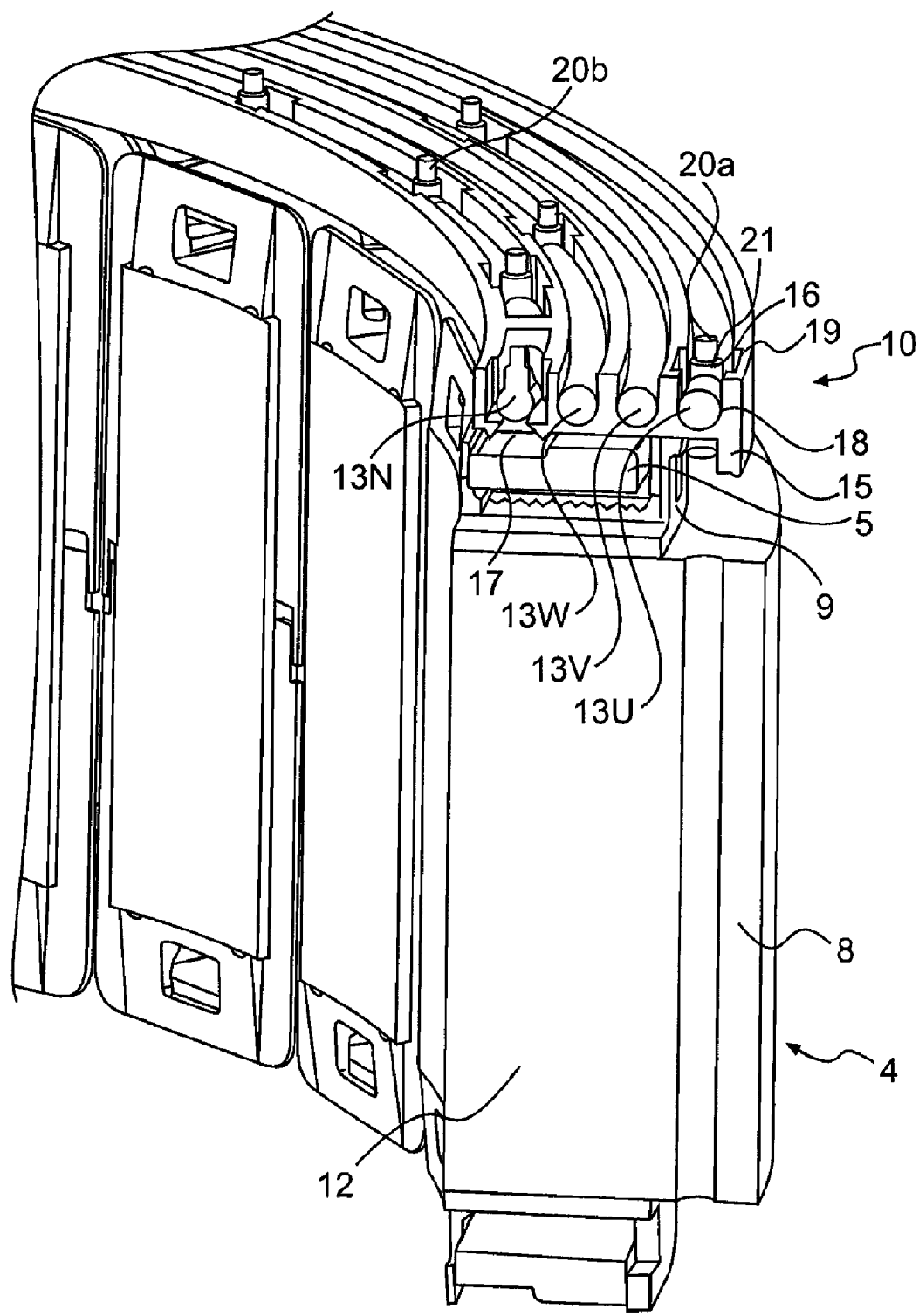
FIG. 5 is a cross-sectional perspective view showing a state in which a stator is assembled to a connecting ring, which is a power distribution unit of a rotary electric machine according to one embodiment of the present invention.

Referring to FIG. 5, explanation is made on a state in which the stator is assembled to the connecting ring, which is the power distribution unit for a rotary electric machine according to this embodiment.

FIG. 5 is a cross-sectional perspective view showing the state in which the stator is assembled according to one embodiment of the present invention.

In the power distribution unit 10, the insulating member 15 is provided with holes 17 through which the coil ends 20a and 20b of the stator coil 5 are inserted. The coil ends 20a and 20b of the coils are inserted through the holes 17 in the insulating member 15 and further connected with one of the terminals 16 of the connecting rings 13U, 13V, and 13W. The protrusion 21 of each of the terminals 16 is provided with the holes 22 and 23 (FIG. 6) as explained in reference to FIG. 6 and the coil ends 20a and 20b (FIG. 6) of the coils are inserted into the holes 22 and 23 and then connected or fixed by soldering, brazing, or TIG welding.

In this embodiment, the insulating member 15 is provided with twenty four (24) holes for the connecting ring 13N and eight (8) holes for each of the connecting rings 13U, 13V, and 13W.

Moreover, in the grooves 18 in the insulating member 15, a space or gap 19 is formed in a portion corresponding to each of the terminals 16 of the connecting rings to avoid thermal influence upon joining the terminals 16.

At the tip of the protrusion 21 of the terminal 16 of each connecting ring, there are exposed the coil ends 22a and 22b of the stator coil 5 inserted through the hole 22 of the connecting ring. Moreover, the power distribution unit 10 is arranged above an end face of the winding of the stator coil 5. In this manner, the power distribution unit 10 formed into an annular ring is attached to the stator 4. At the same time, the coil ends 20a and 20b of the stator coil 5 are inserted into the insertion holes 22 of the terminals 16 corresponding to the connecting rings of U-, V-, and W-phases and then the neutral point and each of the protrusions 21 of the terminals 16 and the coil ends 20a and 20b are directly connected with each other by soldering, brazing or TIG welding, so that the stator coils are connected for each phase, separately, and also connected to the neutral points in common.

Referring to FIG. 6, explanation is made on the construction of the terminal 16 of the connecting ring in the power distribution unit for a rotary electric machine according to this embodiment.

FIG. 6 is a cross-sectional perspective view showing the construction of a terminal section of the connecting ring according to one embodiment of the present invention.

The terminals 16 of the connecting rings 13U, 13V, 13W are each formed with the hole 22 in the direction of axis of the rotary electric machine 1 by plastic working. Simultaneously with the working of the hole 22, the protrusion 21 is formed, and substantially in the center of the protrusion 21, there is provided a through hole 23 through which the coil end 20*a* or 20*b* of the stator coil 5 are to be inserted. By working the hole 22 and the protrusion 21 simultaneously by plastic working, the space of the hole 22 and the volume of the protrusion 21 can be made substantially identical to each other, so that the working of the protrusion 21 becomes relatively easy. Moreover, by working the hole 22 and the protrusion 21 simultaneously by plastic working, the volume of the protrusion 21 excluding that of the through hole 23 can be made substantially identical to the volume of the tip of the coil end 20*a* or 20*b* of the stator coil 5 to be inserted into the through hole 23. This makes the connection by TIG welding stable due to thermal balance upon welding. Moreover, by caulking the protrusion 21 from outside after the coil end 20*a* or 20*b* of the stator coil 5 is inserted into the through hole 23, the coil end 20*a* or 20*b* is fixed to the protrusion 21.

An insulation coating is applied on the respective areas of the terminals 16 and then dried. In the respective areas, the joint section 24 where the protrusion 21 and the coil end 20*a* or 20*b* of the coil where the insulation coating has been removed are connected is provided. This increases quality of insulation between the connecting rings to a further extent.

In this embodiment, the linear conductor to be worked as a connecting ring is, for example, an enameled wire with an insulation coating. However, when the voltage applied to the rotary electric machine 1 is relatively low, a bare wire, i.e., a conductor without insulation coatings may be used as a material for the connecting ring, since a creepage distance between the connecting rings can be sufficiently obtained by the grooves formed at the insulating member 15.

Note that the power distribution units in Examples 1 and 2 each can be arranged in a rotary electric machine, for example, a three-phase thin DC brushless motor to be used in a hybrid automobile as shown in, for example, FIG. 1 of U.S. Patent Application Publication No. US 2003/0173842A1 to obtain a rotary electric machine according to an embodiment of the present invention.

As mentioned above, according to the embodiments of the present invention, at least one of the following advantages is obtainable.

(1) The connecting rings 13U, 13V, and 13W for connecting the U-, V-, and W-phases and the connecting ring 13N for connecting the neutral points of the rotary electric machine 1 are each provided with the protrusions 21 formed in the axial direction and the stator coils 5 are connected to the protrusions 21 with the coil ends 20*a* and 20*b* raised up in the axial direction of the stator coils 5. As a result, the connecting sections do not extend transversely to make it possible to secure a distance necessary for insulation between adjacent connecting rings and increase reliability of insulation.

(2) The hole 22 and the protrusion 21 can be integrally formed by plastic forming, which makes it unnecessary to form a planar part by press working. As a result, the wire connection section does not extend transversely to allow a sufficient insulation distance to be secured between the adjacent connecting rings of different phases. This in turn prevents occurrences of shortage between the phases and of insulation failure due to partial discharge, so that quality of insulation can be increased.

(3) The protrusion 21 in the penetrating direction of the hole 22 (except for the insertion hole) can be formed so as to have substantially the same volume as that of the wiring end of the stator coil 5 inserted in the hole 22, so that heat capacities of these are substantially the same. As a result, heat will be well balanced upon welding, which makes welding of the protrusion 21 with the wiring end of the stator coil 5 easier and more reliable than ever.

(4) The connecting rings are arranged substantially in a concentric fashion in the same plane, there is no overlap of the connecting rings in the axial direction of the rotary electric machine 1, so that the power distribution unit 10 can be made compact in the direction of axis of the rotary electric machine 1.

(5) The power distribution unit 10 can be constructed so as to have a height substantially as high as that of a single connecting ring, so that the space on an end face of the stator 4 in the axial direction thereof can be minimized and the size of the rotary electric machine 1 in the axial direction thereof can be reduced. In addition, it is possible to dispose the terminal section for connection of the connecting ring on an extended line of the wiring end of the stator coil 5.

(6) The rotary electric machine 1 can be constructed such that the wiring end of the stator coil 5 is inserted into the hole 22 of the terminal section for connection and welded the wiring end to the hole 22 without using other connection components. As a result, the number of components can be reduced to decrease cost for parts and hence production cost.

(7) The terminals 16 to which the coil ends 20*a* and 20*b* of the stator coils 5 of different phases are connected are arranged in the circumferential direction so that they are not adjacent in the circumferential direction between the different phases. As a result, the distance of insulation is relatively large, thus increasing the quality of insulation.

(8) The connecting ring excluding the terminal section is coated with the insulation material and the terminal sections are disposed without being adjacent to each other. As a result, a sufficient insulation distance can be secured between adjacent connecting rings. This prevents occurrences of shortage between the phases and of insulation failure due to partial discharge.

(9) The power distribution unit 10 is arranged on the edge of the stator 4 in the axial direction to allow the coil ends 20*a* and 20*b* of stator coils 5 and the connecting rings to be directly connected with each other. As a result, the number of components of the power distribution unit 10 can be greatly decreased, so that the power distribution unit 10 can be provided at low cost with high productivity.

(10) The terminal section of the connecting ring can be disposed on an extended line of the wiring end of the stator coil 5. As a result, the power distribution unit 10 can be constructed without adding new parts for connection.

(11) Since the protrusions 21 and the ends of stator coil 20*a* or 20*b* are caulked and connected or fixed with each other by welding, it is possible to achieve stable welding to increase reliability of the connection.

(12) The wiring end of the stator coil 5 and the protrusion 21 of the terminal can be stably welded, soldered or brazed to each other without relative movement therebetween due to fusion of the wiring end with the protrusion 21.

(13) In addition, since the insulating member 15 is provided with grooves 18, the distance of insulation, particularly the creepage distance of insulation, between the connecting rings is secured to a greater extent, so that the insulation coating of the connecting rings can be avoided. This leads to a decrease in production cost of the power distribution unit 10.

(14) According to the above noted embodiment, insulation distances can be secured between any adjacent connecting rings of different phases, soldering, welding or brazing is easy to perform, the size in the axial direction can be reduced. The power distribution unit 10 of the present invention can be produced at low cost without increasing the number of parts at high productivity.

The above described embodiments are examples and various modifications can be made without departing from the scope of the invention.

What is claimed is:

1. A power distribution unit for a rotary electric machine, comprising:
   at least one connecting ring that connects stator coils of the same phase, wherein the at least one connecting ring includes at least one linear conductor integrally formed in a ring-like shape, and
   wherein the at least one connecting ring includes a terminal section integrally formed in the linear conductor, the terminal section being provided with
   (a) a first hole extending in an axial direction through which a wiring end of one of the stator coils is to be inserted and
   (b) a protrusion formed in a penetrating direction of the first hole to which the wiring end of one of the stator coils is to be connected, the protrusion being provided with a second hole that forms a hole with the first hole and extends in the axial direction through which the wiring end of the stator coil having passed through the first hole is to be inserted, and
   wherein the first hole has a diameter larger on a side where the wiring end of the stator coil is inserted than a diameter of the second hole where the wiring end of the stator coil is connected; and
   wherein the protrusion has a volume smaller than a volume of the at least one connecting ring excluding the protrusion.

2. A power distribution unit for a rotary electric machine according to claim 1, further comprising:
   an insulating member of a torus shape, wherein
   the at least one connecting ring includes connecting rings for U-, V-, and W-phases, respectively, and a connecting ring for neutral points,
   the connecting rings are arranged on the insulating member substantially in the same plane and concentrically, and
   at each terminal section, the writing ends of the stator coils are connected to the at least one connecting ring corresponding thereto.

3. A power distribution unit for a rotary electric machine according to claim 2, wherein
   the connecting rings each include a coated linear conductor with a coating of an insulation material,
   the terminal section of each coated linear conductor, which is provided with the hole through which the wiring end is to be inserted and the protrusion in the penetrating direction of the hole, is free of the coating of the insulation material, and
   the terminal sections of the linear conductors for U, V, and W phases and the linear conductor for the neutral points are arranged at mutually different positions in the circumferential direction such that the terminal sections are not adjacent to each other.

4. A rotary electric machine comprising a power distribution unit according to claim 1, wherein
   the power distribution unit is arranged on an end face of a wiring section of the stator coil in a direction of an axis of a stator.

5. A rotary electric machine comprising a power distribution unit according to claim 1, wherein
   the wiring end of the stator coil is inserted in the hole, caulked for fixation by the protrusion formed in the terminal section, and connected to the protrusion of the terminal section by soldering, welding or brazing.

6. A power distribution unit for a rotary electric machine according to claim 1, wherein the hole of the terminal section formed by the first and second holes has an axial length greater than a maximum cross-section dimension of the linear conductor outside of the terminal section.

* * * * *